United States Patent
Zhang et al.

(10) Patent No.: US 12,040,859 B2
(45) Date of Patent: *Jul. 16, 2024

(54) CODEBOOK SUBSET RESTRICTION FOR ENHANCED TYPE II CHANNEL STATE INFORMATION REPORTING

(71) Applicant: Apple Inc., Cupertino, CA (US)

(72) Inventors: Yu Zhang, Beijing (CN); Dawei Zhang, Saratoga, CA (US); Haitong Sun, Irvine, CA (US); Wei Zeng, San Diego, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,839

(22) Filed: May 19, 2023

(65) Prior Publication Data

US 2023/0308145 A1    Sep. 28, 2023

Related U.S. Application Data

(63) Continuation of application No. 17/965,147, filed on Oct. 13, 2022, now Pat. No. 11,705,945, which is a
(Continued)

(30) Foreign Application Priority Data

Jan. 9, 2019    (CN) .......................... 201910018336.3

(51) Int. Cl.
*H04B 7/0456*    (2017.01)
*H04B 7/06*    (2006.01)

(52) U.S. Cl.
CPC ........... *H04B 7/0456* (2013.01); *H04B 7/046* (2013.01); *H04B 7/0626* (2013.01)

(58) Field of Classification Search
CPC .... H04B 7/0456; H04B 7/046; H04B 7/0626; H04B 7/0469; H04B 7/0478; H04B 7/0639; H04B 7/0658
See application file for complete search history.

(56) References Cited

U.S. PATENT DOCUMENTS 9,531,454 B2    12/2016    Shi
10,396,877 B2    8/2019    Kim
(Continued)

FOREIGN PATENT DOCUMENTS

| CN | 105027463 | 11/2015 |
|---|---|---|
| CN | 107925454 | 4/2018 |
| WO | 2018132781 | 7/2018 |

OTHER PUBLICATIONS

ZTE; "CSI Enhancement for MU-MIMO Support," 3GPP TSG RAN WG1 Meeting #95 R1-1813913, Nov. 12-16, 2018.
(Continued)

*Primary Examiner* — Vineeta S Panwalkar
(74) *Attorney, Agent, or Firm* — Kowert, Hood, Munyon, Rankin & Goetzel, P.C.

(57) ABSTRACT

A base station may transmit to a device an indication of codebook subset restriction (CBSR), which includes at least a restriction on a frequency basis. The device may receive the indication of CBSR, and may transmit to the base station channel state information (CSI) according to the received indication of CBSR. The indication of CBSR may also include a restriction on a spatial basis and restrict the device from reporting the CSI based on a subset of the frequency basis in addition to the spatial basis per configuration of the base station. The indication of CBSR may include a separately configured maximum allowed amplitude of a weighting coefficient for the spatial basis and the frequency basis, where the weighting coefficient is associated with a column vector of a precoding matrix used by the base station and the
(Continued)

device. The number of frequency bases and the frequency compression units may be determined based on a number of different criteria, for example the number of antennas, the number of subbands, etc.

20 Claims, 14 Drawing Sheets

Related U.S. Application Data continuation of application No. 17/224,915, filed on Apr. 7, 2021, now Pat. No. 11,489,567, which is a continuation of application No. 16/735,750, filed on Jan. 7, 2020, now Pat. No. 10,979,109.

(56) References Cited

U.S. PATENT DOCUMENTS

| 2013/0163687 A1 | 6/2013 | Jing |
| 2016/0329937 A1 | 11/2016 | Shi |
| 2019/0068267 A1 | 2/2019 | Rahman |
| 2019/0215130 A1 | 7/2019 | Alba |

OTHER PUBLICATIONS

Samsung; "Summary of CSI Enhancement for MU-MIMO Support," 3GPP TSG RAN WG1 Meeting #95 R1-1813002,, Nov. 12-16, 2018, Nov. 12-16, 2018.
Samsung et al. "Summary WF for Open Issues on CSI Reporting," 3GPP Draft, R1-1716726 WF CSI, 3rd Generation Partnership Project (3GPP), Mobile Competence Centre; France, vol. 1 RAN WG1, No.; Sep. 18, 201-Sep. 21, 2017, Sep. 20, 2017.
European Search Report from Application No. 20150783.7-1220, dated Apr. 7, 2020.
Preliminary Rejection for Chinese Application No. CN 10-2020-0003247, dated Jun. 12, 2021.
AT & T "On Codebook Subset Restriction for NR"; 3GPP TSG RAN WG1 Meeting AH_NR#3 R1-1716178; Sep. 18-21, 2017.
Samsung et al. "WF on Type I and II CSI Codebooks"; 3GPP TSG-RAN WG1 #89 R1-1709232; May 15-19, 2017.
First Office Action for CN Patent Application No. 201910018336.3, Sep. 1, 2021.
Extended European Search Report for EP Patent Application No. 21191189.6, Oct. 8, 2021.
Huawei et al. "Enhancements on CSI reporting and codebook design"; 3GPP TSG RAN WG1 Meeting #94 R1-1808949; Aug. 20-24, 2018.
Notice of Allowance for Korean Patent Application No. 10-2022-0029003; Apr. 7, 2022.
MediaTek Inc. "CSI enhancement for MU-MIMO"; 3GPP TSG RAN WG1 Meeting #91 R1-1812348; Nov. 12, 2018.
Samsung "Chairman's notes of AI 7.2.8 Enhancements on MIMO for NR"; 3GPP TSG RAN WG1 Meeting #95 R1-1813848; Nov. 12, 2018.
Samsung "Outcome of offline session for CSI enhancement for MU-MIMO support"; 3GPP TSG RAN WG1 Meeting #95 R1-1814201; Nov. 12, 2018.
Huawei et al. "Codebook Subset Restriction in advanced CSI"; 3GPP TSG RAN WG1 Meeting #92 R1-1801870; Feb. 26, 2018.

| $N_3$ | i | j | k | $N''_3=$ |
|---|---|---|---|---|
| 1 | 0 | 0 | 0 | 1 |
| 2 | 1 | 0 | 0 | 2 |
| 3 | 0 | 1 | 0 | 3 |
| 4 | 2 | 0 | 0 | 4 |
| 5 | 0 | 0 | 1 | 5 |
| 6 | 1 | 1 | 0 | 6 |
| 7 | 3 | 0 | 0 | 8 |
| 8 | 3 | 0 | 0 | 8 |
| 9 | 1 | 0 | 1 | 10 |
| 10 | 1 | 0 | 1 | 10 |
| 11 | 2 | 1 | 0 | 12 |
| 12 | 2 | 1 | 0 | 12 |
| 13 | 0 | 1 | 1 | 15 |
| 14 | 0 | 1 | 1 | 15 |
| 15 | 0 | 1 | 1 | 15 |
| 16 | 4 | 0 | 0 | 16 |
| 17 | 1 | 2 | 0 | 18 |
| 18 | 1 | 2 | 0 | 18 |
| 19 | 2 | 0 | 1 | 20 |

FIG. 14

CODEBOOK SUBSET RESTRICTION FOR ENHANCED TYPE II CHANNEL STATE INFORMATION REPORTING

PRIORITY CLAIM

This application is a continuation of U.S. patent application Ser. No. 17/965,147, titled "Codebook Subset Restriction for Enhanced Type II Channel State Information Reporting", filed on Oct. 13, 2022 which is a continuation of U.S. patent application Ser. No. 17/224,915 titled "Codebook Subset Restriction for Enhanced Type II Channel State Information Reporting", filed on Apr. 7, 2021, which is a continuation of U.S. patent application Ser. No. 16/735,750 titled "Codebook Subset Restriction for Enhanced Type II Channel State Information Reporting", filed on Jan. 7, 2020, which itself claims benefit of priority of Chinese Patent Application Serial no. 201910018336.3 titled "Codebook Subset Restriction for Enhanced Type II Channel State Information Reporting", filed on Jan. 9, 2019, all of which are hereby incorporated by reference as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, and more particularly to channel state information reporting during wireless cellular communications, e.g. during 5G-NR communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. The ever increasing number of features and functionality introduced in wireless communication devices creates a continuous need for improvement in both wireless communications and in wireless communication devices. In particular, it is important to ensure the accuracy of transmitted and received signals. The UEs, which may be mobile telephones or smart phones, portable gaming devices, communication systems/devices housed in or otherwise carried by transportation vehicles (e.g. cars, buses, trains, trucks, motorcycles, etc.), laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, 5G-NR, Wi-Fi, BLUETOOTH™, etc.). There are ongoing efforts to achieve efficient use of wireless communication resources and thereby increase system and device operation efficiency.

Many wireless communication standards provide for the use of known signals (e.g., pilot or reference signals) for a variety of purposes, such as synchronization, measurements, equalization, control, etc. For example, in cellular wireless communications, reference signals (RS, for short) represent a special signal that exists only at the physical layer and is not used for delivering any specific information but to deliver a reference point for the downlink power. When a wireless communication device or mobile device (UE) attempts to determine downlink power (e.g. the power of the signal from a base station, such as eNB for LTE and gNB for NR), it measures the power of the reference signal and uses it to determine the downlink cell power. The reference signal also assists the receiver in demodulating the received signals. Since the reference signals include data known to both the transmitter and the receiver, the receiver may use the reference signal to determine/identify various characteristics of the communication channel. This is commonly referred to as 'Channel Estimation', which is a critical part of many high-end wireless communications such as LTE and 5G-NR communications. Known channel properties of a communication link in wireless communications are referred to as channel state information (CSI), which provides information indicative of the combined effects of, for example, scattering, fading, and power decay with distance. The CSI makes it possible to adapt transmissions to current channel conditions, which is crucial for achieving reliable communications with high data rates in multi-antenna systems.

Oftentimes multi-antenna systems use precoding for improved communications. Precoding is an extension of beamforming to support multi-stream (or multi-layer) transmissions for multi-antenna wireless communications and is used to control the differences in signal properties between the respective signals transmitted from multiple antennas by modifying the signal transmitted from each antenna according to a precoding matrix. In one sense, precoding may be considered a process of cross coupling the signals before transmission (in closed loop operation) to equalize the demodulated performance of the layers. The precoding matrix is generally selected from a codebook that defines multiple precoding matrix candidates, and a precoding matrix candidate is typically selected according to a desired performance level, based on any of a number of different factors, such as current system configuration, communication environment, and/or feedback information from the receiver, e.g. a mobile device (UE) receiving the transmitted signal(s).

The feedback information is used in selecting a precoding matrix candidate by defining the same codebook at both the transmitter (which may be a base station) and the receiver (which may be a mobile device, or UE), and using the feedback information from the receiver as an indication of a preferred precoding matrix. In such cases the feedback information includes what is referred to as a precoding matrix index (PMI), which can be based on properties of the signals received at the receiver. For example, the receiver may determine that a received signal has relatively low signal-to-noise ratio (SNR), and may accordingly transmit a PMI that would replace a current precoding matrix with a new precoding matrix to increase the signal-to-noise ratio (SNR).

Under certain circumstances, the set of precoding matrix candidates that can be selected from the codebook may need to be limited. For example, the network may prevent the receiver from selecting some precoding matrix candidates while allowing it to select others. This is commonly referred to as codebook subset restriction, or CBSR for short. CBSR may include the transmission of a CBSR bitmap from a transmitter (e.g. a base station) to a receiver (e.g. a UE). The CBSR bitmap typically includes a bit corresponding to each precoding matrix in the codebook, with the value of each bit (e.g., "0" or "1") indicating to the receiver whether or not the receiver is restricted from considering a corresponding precoding matrix candidate as a preferred precoding candidate to request from the base station. One disadvantage of CBSR is increased signaling overhead. For example, in some systems, the CBSR bitmap might contain a high number (e.g. 64) of bits per channel, requiring a transmitting device to transmit a relatively large amount of information to implement CBSR for all of its channels.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, to use codebook subset restriction (CBSR) based on both spatial considerations and frequency considerations for enhanced channel state information (CSI) reporting during wireless communications, e.g. during 5G-NR communications. Embodiments are further presented herein for wireless communication systems containing wireless communication devices (UEs) and/or base stations and access points (APs) communicating with each other within the wireless communication systems.

In some embodiments, a base station may transmit, to a device, an indication of codebook subset restriction (CBSR), with the indication including at least a restriction on a frequency basis. The device may receive the indication of CBSR, and may transmit, to the base station, channel state information (CSI) according to the received indication of CBSR. The indication of CBSR may further include a restriction on a spatial basis and may restrict the device from reporting the CSI based on a subset of the frequency basis in addition to the spatial basis per configuration of the base station. The indication of CBSR may include a separately configured maximum allowed amplitude of a weighting coefficient for the spatial basis and the frequency basis, with the weighting coefficient corresponding to a column vector of a precoding matrix used by the base station and the device. A maximum allowed amplitude of a weighting coefficient included in the indication of CBSR may be layer specific, and the weighting coefficient may be used in determining a column vector of a precoding matrix used by the base station and the device. In some embodiments, the indication of CBSR includes a restricted spatial basis dependent amplitude of a weighting coefficient and an unrestricted frequency basis dependent amplitude of the weighting coefficient, with the weighting coefficient associated with a column vector of a precoding matrix used by the base station and the device.

The indication of CBSR may include a restricted frequency basis dependent amplitude of a weighting coefficient and an unrestricted spatial basis dependent amplitude of the weighting coefficient, with the weighting coefficient associated with a column vector of a precoding matrix used by the base station and the device. The indication of CBSR may include a restricted frequency basis dependent amplitude of a weighting coefficient and a restricted spatial basis dependent amplitude of the weighting coefficient, with the weighting coefficient associated with a column vector of a precoding matrix used by the base station and the device. In some embodiments, the CBSR includes a maximum allowed amplitude of a weighting coefficient defined by a spatial basis dependent amplitude, a frequency basis dependent amplitude, and a spatial basis and frequency basis dependent amplitude, with the weighting coefficient associated with a column vector of a precoding matrix used by the base station and the device. The indication of CBSR may include a respective amplitude restriction corresponding to each frequency component, where the respective amplitude restriction is for a weighting coefficient associated with a column vector of a precoding matrix used by the base station and the device.

The indication of CBSR may restrict the device from reporting a subset of combinations of spatial and frequency basis per configuration of the base station. The indication of CBSR may also configure a subset of spatial basis groups and a respective set of frequency basis restriction for each of the spatial basis groups in the device. The CBSR may include a respective maximum allowed amplitude of a weighting coefficient for each of the combinations of spatial and frequency basis, where the weighting coefficient is associated with a column vector of a precoding matrix used by the base station and the device.

In some embodiments, an apparatus may operate to cause a device to obtain a value M for a spatial basis of an enhanced channel state information (CSI) feedback, with the enhanced CSI feedback including information for one or more spatial beams for a number of subbands associated with the enhanced CSI feedback. A coefficient of the spatial basis may be based on M corresponding frequency bases, with the value M determined in part based on the number of subbands, with M being less than the number of subbands. The device may transmit, to a base station, the enhanced CSI feedback based in part on the value M. In some embodiments, M may be selected by the device, which may transmit the value M in the enhanced CSI feedback. In some embodiments, the device may obtain the value M explicitly from the base station via dedicated higher-layer signaling. In such cases the value M is explicitly configured in the device by the base station via higher-layer (e.g. RRC) signaling. Alternately, the value M may be derived by the device from other parameters based on higher-layer signaling from the base station and further based on specified, predefined rules. The value M may be determined in part based on one or more of a number $N_1$ of transmitting antennas in the vertical dimension, or a number $N_2$ of transmitting antennas in the horizontal dimension, with the one or more spatial beams including multiple spatial beams divided into groups, with each group having $N_1 \times N_2$ spatial bases.

The device may obtain a respective value $M_i$ for each spatial basis of a number of spatial bases of the enhanced channel CSI feedback, where a coefficient of each spatial basis is based on $M_i$ corresponding frequency bases, and each respective value $M_i$ is determined in part based on the number of subbands and is less than the number of subbands. In some embodiments, at least two of the $M_i$ values differ from each other. The device may transmit, to a base station, the enhanced CSI feedback based in part on the respective $M_i$ values.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 14 shows a table of exemplary exponent values for determining the frequency bases corresponding to all considered subbands for improved CBSR, according to some embodiments.

Figure 1:
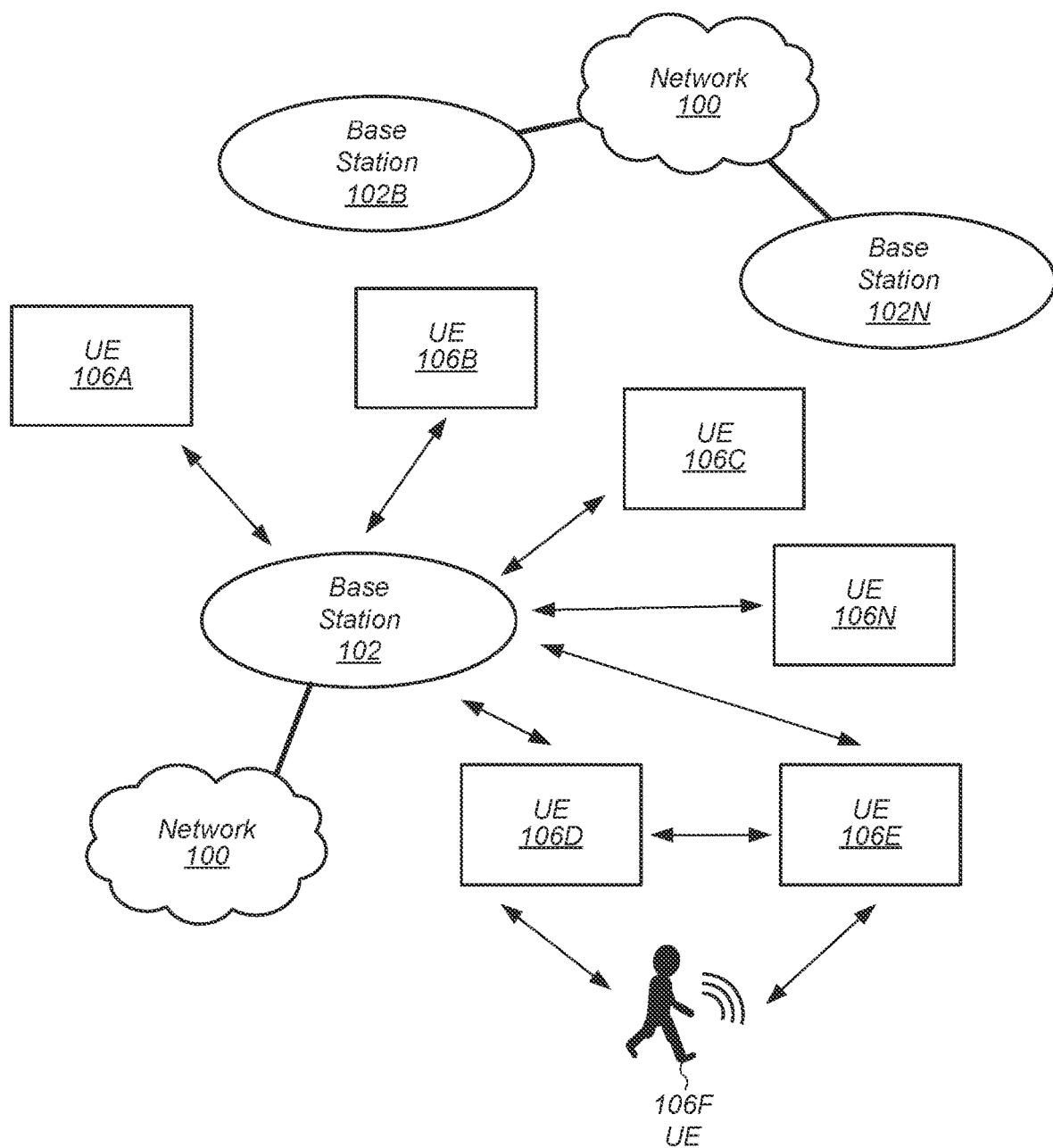
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
AS: Access Stratum
BS: Base Station
BSR: Buffer Size Report
BSSID: Basic Service Set Identifier
CBRS: Citizens Broadband Radio Service
CBSD: Citizens Broadband Radio Service Device
CBSR: Codebook Subset Restriction
CCA: Clear Channel Assessment
CMR: Change Mode Request
CS: Circuit Switched
CSI: Channel State Information
DL: Downlink (from BS to UE)
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MIMO: Multiple-In Multiple-Out
MNO: Mobile Network Operator
MU: Multi-User
NAS: Non-Access Stratum
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density PSS: Primary Synchronization Signal
PT: Payload Type
QBSS: Quality of Service Enhanced Basic Service Set
QI: Quality Indicator
RAN: Radio Access Network
RAT: Radio Access Technology
RF: Radio Frequency
ROHC: Robust Header Compression
RRC: Radio Resource Control
RTP: Real-time Transport Protocol
RTT: Round Trip Time
RX: Reception/Receive
SAS: Spectrum Allocation Server
SI: System Information
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX: Transmission/Transmit
UE: User Equipment
UI: User Interface
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™ etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In cellular radio communications, signal and data transmissions may be organized according to designated time units of specific duration during which transmissions take place. For example, in LTE, transmissions are divided into radio frames, each radio frame being of equal (time) duration (e.g. each radio frame may be 10 ms). A radio frame in LTE may be further divided into ten subframes, each subframe being of equal duration, with the subframes designated as the smallest (minimum) scheduling unit, or the designated time unit for a transmission. Similarly, a smallest (or minimum) scheduling unit for 5G NR (or NR, for short) transmissions is referred to as a slot. Accordingly, as used herein, the term "slot" is used to reference a smallest (or minimum) scheduling time unit for the wireless communications being described for NR communications. However, as noted above, in different communication protocols such a scheduling time unit may be named differently, e.g. a "subframe" in LTE, etc.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
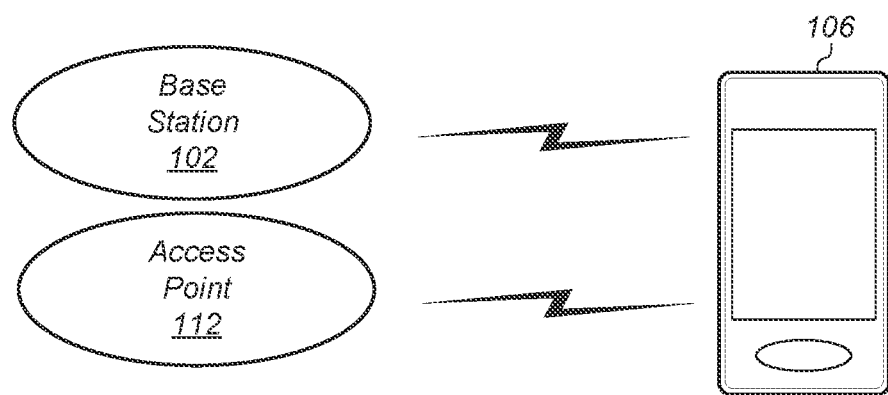
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base stations 102A through 102N, also collectively referred to as base station(s) 102 or base station 102. As shown in FIG. 1, base station 102A communicates over a transmission medium with one or more user devices 106A, 106B, etc., through 106N. Each of the user devices may be referred to herein as a "user equipment" (UE) or UE device. Thus, the user devices 106A through 106N are referred to as UEs or UE devices, and are also collectively referred to of UE(s) 106 or UE 106. Various ones of the UE devices may use codebook subset restriction (CBSR) based on both spatial and frequency considerations for enhanced channel state information (CSI) reporting during wireless communications, e.g. during 5G-NR communications, according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station 102 may communicate with UEs that use codebook subset restriction based on both spatial and frequency considerations for enhanced channel state information reporting during wireless communications, e.g. during 5G-NR communications, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Further aspects of vehicles communicating in network exemplified in FIG. 1 will be discussed below, for example in the context of vehicle-to-everything (V2X) communication such as the communications specified by 3GPP TS 22.185 V.14.3.0, among others.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antenFnas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
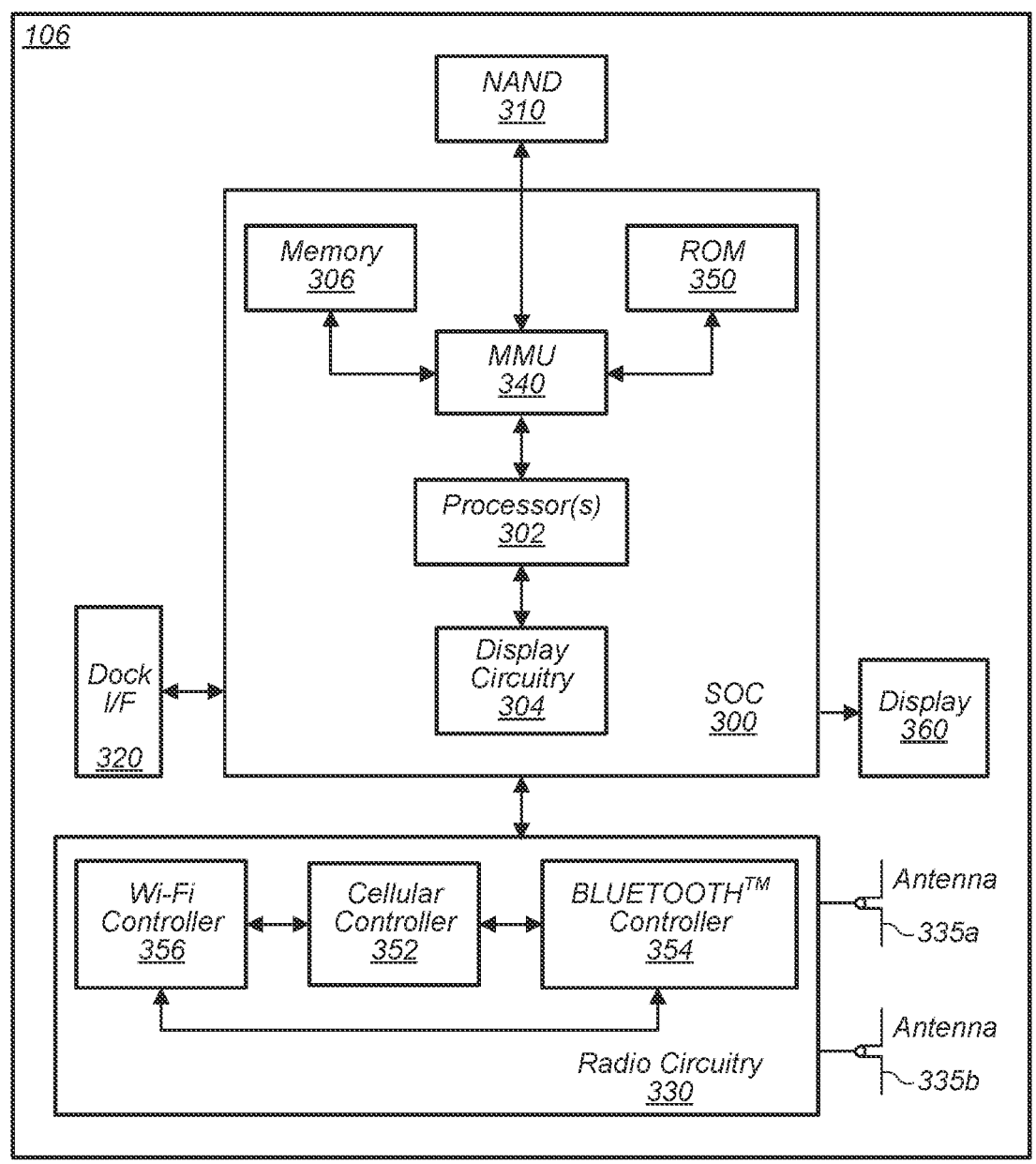
FIG. 3 illustrates an exemplary block diagram of a UE, according to some embodiments.

FIG. 3—Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360.

The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to use codebook subset restriction based on both spatial and frequency considerations for enhanced channel state information reporting during wireless communications, e.g. during 5G-NR communications, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to use codebook subset restriction (CBSR) based on both spatial and frequency considerations for enhanced channel state information (CSI) reporting during wireless communications, e.g. during 5G-NR communications, according to various embodiments disclosed herein. Processor(s) 302 may also implement various other applications and/or end-user applications running on UE 106.

Figure 5:
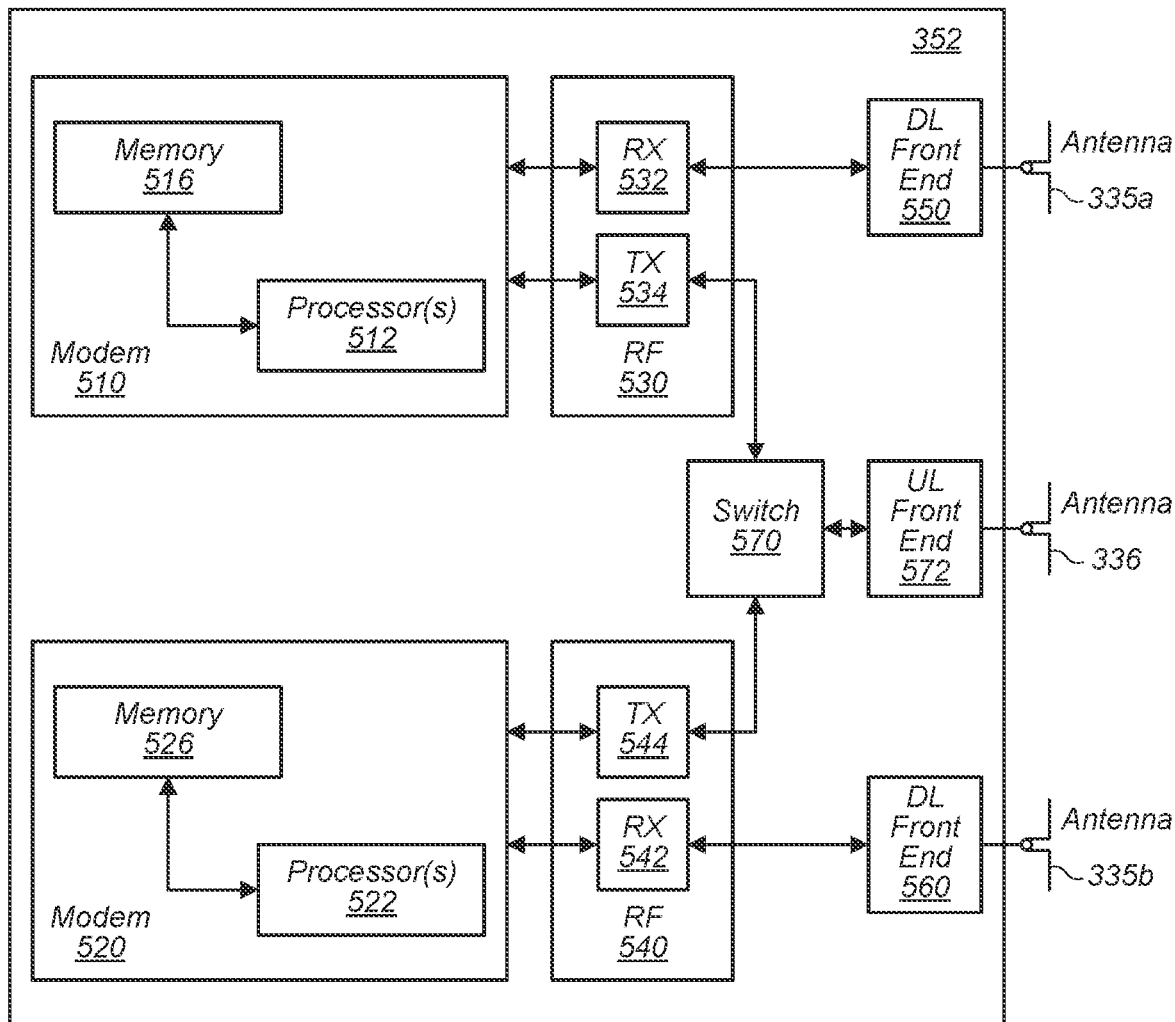
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
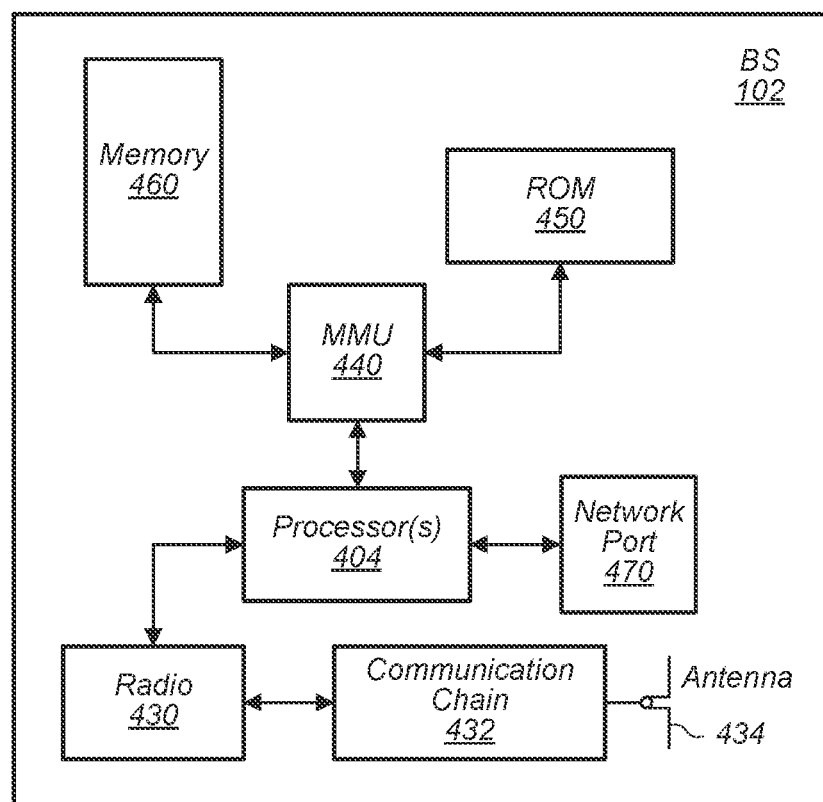
FIG. 4 illustrates an exemplary block diagram of a base station, according to some embodiments.

FIG. 4—Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that may use codebook subset restriction based on both spatial and frequency considerations for enhanced channel state information reporting during wireless communications, e.g. during 5G-NR communications. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for communicating with UE devices that codebook subset restriction based on both spatial and frequency considerations for enhanced channel state information reporting during wireless communications, e.g. during 5G-NR communications, as disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Codebook Subset Restriction (CBSR) and Channel State Information (CSI) Reporting As previously mentioned, CBSR is used to restrict the precoding matrix candidates that a UE may consider for CSI reporting. That is, the UE may be configured such that some precoder candidates are not to be considered for CSI reporting, and thus not to be requested from the base station. Overall, for multi-user multiple-in multiple-pout (MU-MIMO) systems, a base station (e.g. gNB) may force multiple UEs (e.g. two UEs) to report their precoding matrices, or precoding matrix candidates in mutually orthogonal directions. For example, a gNB may request a first UE to report precoders formed by beams 0, 1, and request a second UE to report precoders formed by beams 2, 3. In order to reduce the CSI computation complexity for the UE, a gNB may remove from consideration, based on uplink measurements, certain unlikely beams, thereby allowing the UE to not have to test the precoders formed by those beams that were removed from consideration. In other words, in order to reduce computation complexity, based on UL measurements the gNB can restrict the UE to narrow down the search space, the UE therefore not having to consider the entire codebook.

In 3GPP new radio (NR, or 5G-NR) systems, two types of codebook, Type I codebook and Type II codebook, have been standardized for CSI feedback in support of advanced MIMO operations. The two types of codebook are constructed from a two-dimensional (2D) digital Fourier transform (DFT) based grid of beams, enabling CSI feedback of beam selection and phase shift keying (PSK) based co-phase combining between two polarizations. Type II codebook based CSI feedback also reports the wideband and subband amplitude information of the selected beams, allowing for more accurate CSI to be obtained. This, in turn, provides improved precoded MIMO transmissions over the network.

Figure 6:
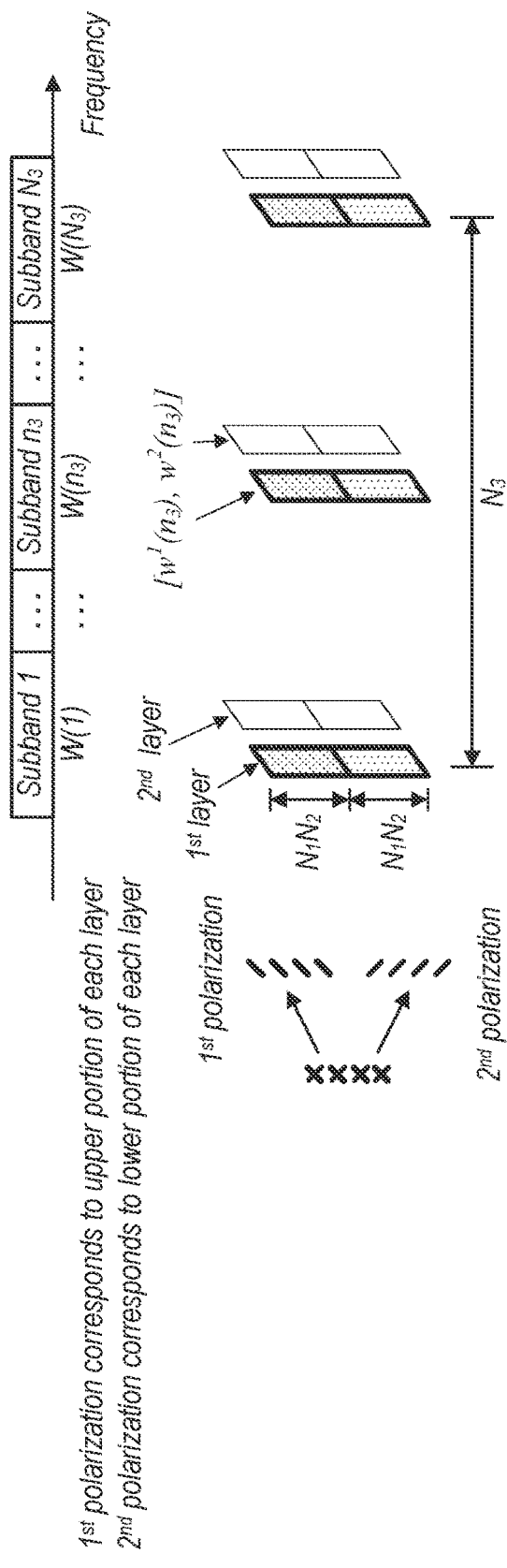
FIG. 6 shows an exemplary diagram illustrating a precoding structure associated with Type II CSI reporting, according to prior art.

FIG. 6 shows an exemplary diagram illustrating the precoding structure associated with Type II CSI reporting, according to prior art. The CSI may be reported to the base station (gNB) to indicate which precoding is preferred by the UE. As mentioned above, there are two types of codebooks for CSI reporting, or, worded differently, two types of CSI reporting, Type I and Type II. In Type II reporting, the precoding matrix is reported for each band, and is represented by a linear combination of a set of a specified number (L) of DFT vectors representing each column. As illustrated in FIG. 6, there may be a specified number ($N_3$) subbands, with a corresponding precoding matrix W for each subband. Each precoding matrix includes two columns, $w^1$ and $w^2$. Each column corresponds to the precoding vector for one layer. For each layer, the precoding vector may be further divided into two parts, a first polarization and second polarization. The L DFT vectors are common for all subbands and are used in subband-specific combinations. Specifically, each column vector is a weighted summation of the specified number (L) of vectors. The weighting (or combination) coefficients for the combination/combined weight are indicated in FIG. 6 by $c_0$, $c_1$, and $c_2$. As indicated in the example of FIG. 6, $v_0$, $v_1$, and $v_2$ represent three DFT vectors. The UE reports to the gNB, which three DFT vectors are preferred.

Figure 7:
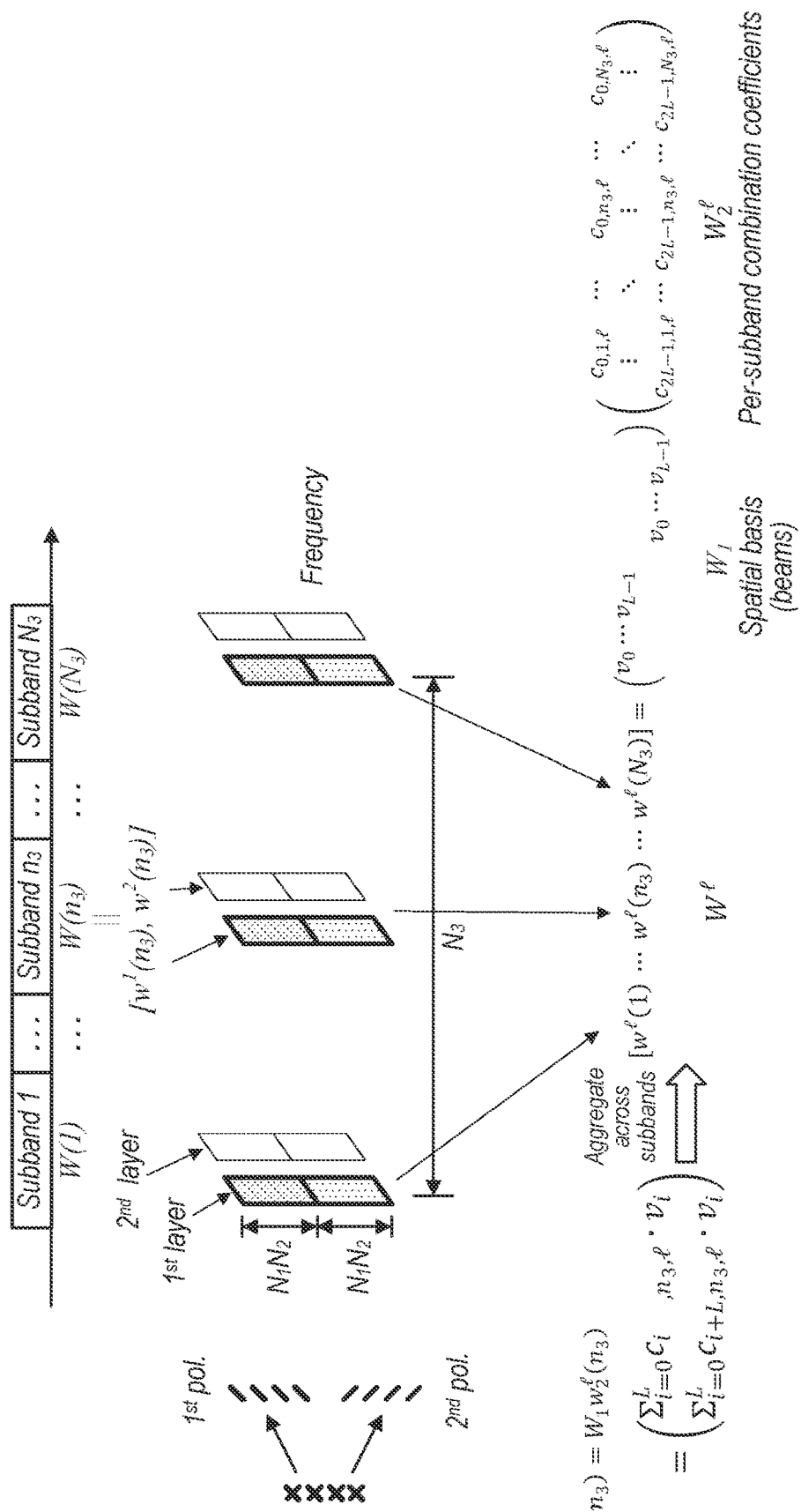
FIG. 7 shows, an exemplary diagram illustrating the reporting structure used by the UE to report back to a base station, according to prior art.

FIG. 7 shows an exemplary diagram illustrating the reporting structure used by the UE to report back to the base station (e.g. to the gNB), according to prior art. Each subband has its own corresponding set of combination coefficients, and eventually the UE needs to report all the combination coefficients. When considering the reporting by the UE, the Type II overhead is dominated by the subband combination coefficient. According to the information shown in FIG. 7, the total number of entries is $2L \times N_3$, there is one (1) bit for amplitude, and there are three (3) bits for phase. In a worst case scenario, there may be 19 subbands, 32 transmit (TX) ports, and a CSI payload size of more than 1000 bits. Therefore, it would be beneficial to reduce the Type II CSI overhead.

Figure 8:
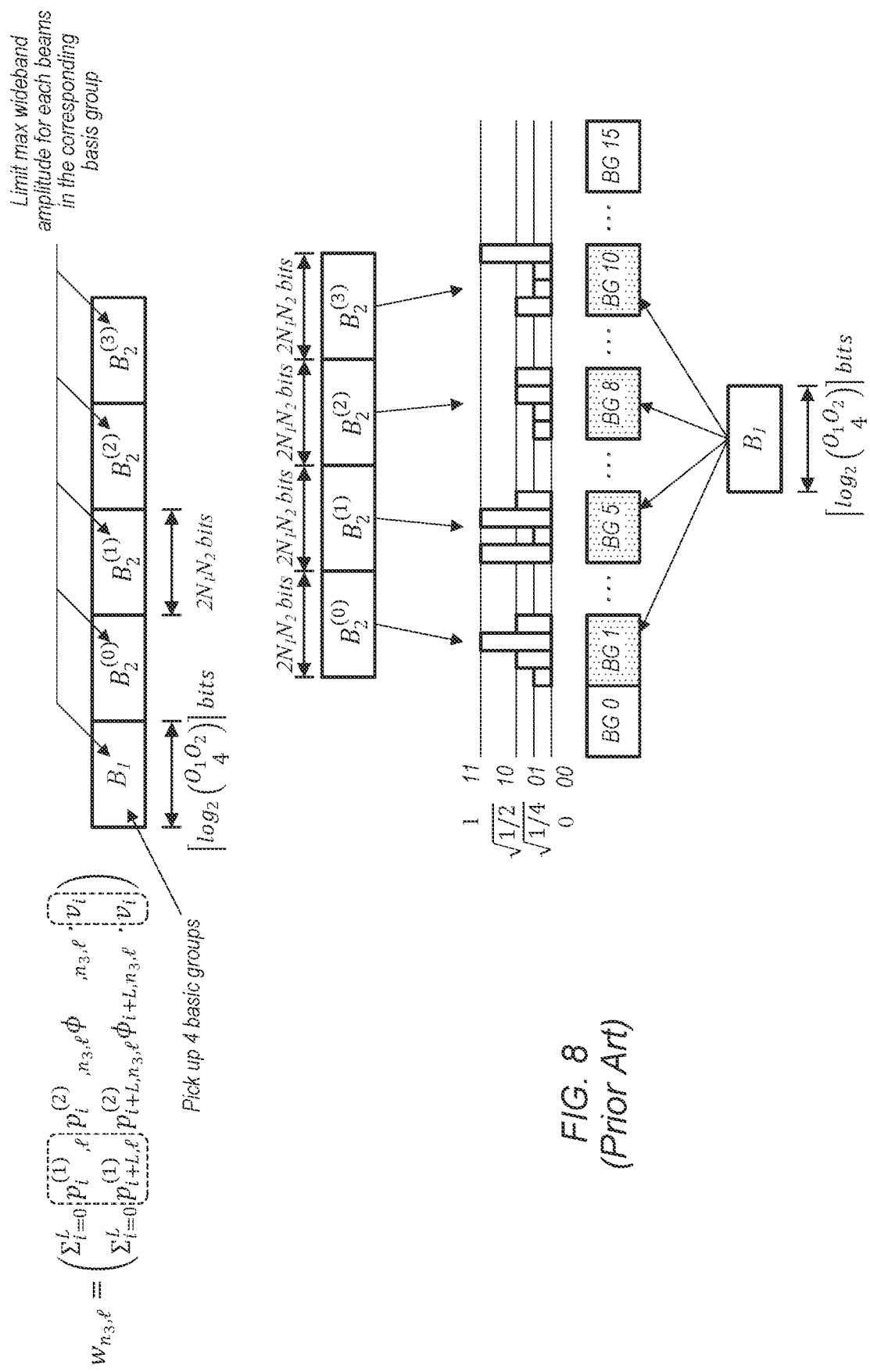
FIG. 8 shows, an exemplary diagram illustrating CBSR associated with Type II CSI reporting, according to prior art.

FIG. 8 shows an exemplary diagram illustrating CBSR associated with Type II CSI reporting, according to prior art. FIG. 8 provides an indication of how CBSR is configured. Overall, a bit sequence is provided to the UE. The bit sequence includes two parts, and each sequence indicates the maximum allowed magnitude for the DFT beams. Accordingly, All $O_1O_2$ beam groups are divided into two categories, restricted or unrestricted. For the basis in an unrestricted beam group, the wideband amplitude is not restricted (e.g. it may have 8 different values). For the basis in a restricted beam group, a maximum allowed wideband amplitude is configured (e.g. it may have 4 different values). That is, the restriction is on a spatial basis. Four spatial basis groups are selected and the maximum wideband amplitude for each beam in the corresponding basis group is limited.

As indicated in FIG. 8, there are two antennas in the vertical dimension (number [$N_1$] of antennas=2) and two antennas in the horizontal direction (number [$N_2$] of antennas=2), yielding sixteen 16 beam groups (BGs). The base station (e.g. gNB) selects four (4) out of the sixteen 16 BGs for consideration. In the example shown, BG 1, BG 5, BG 8, and BG 10 are selected. Selection of these four beam groups is indicated by the first bit sequence, B1. For each beam group, the gNB further signals the UE a short sequence containing eight (8) bits. The eight bits are divided into four groups, each group corresponding to one beam in this group. The four groups are shown in FIG. 8 as $B_2^{(0)}$, $B2^{(1)}$, $B2^{(2)}$, and $B_2^{(3)}$, which can indicate four different maximum amplitude levels. There are four beams in each group, and each beam can indicate the maximum allowed power that the UE may consider in reporting CSI. The maximum amplitude may thereby be controlled for spatial beams. Thus, shown in FIG. 8, CBSR restricts beam groups 1, 5, 8, and 10, with each group consisting of an $N_1N_2$ basis, with the maximum wideband amplitude configured for each beam in each restricted beam group.

Figure 9:
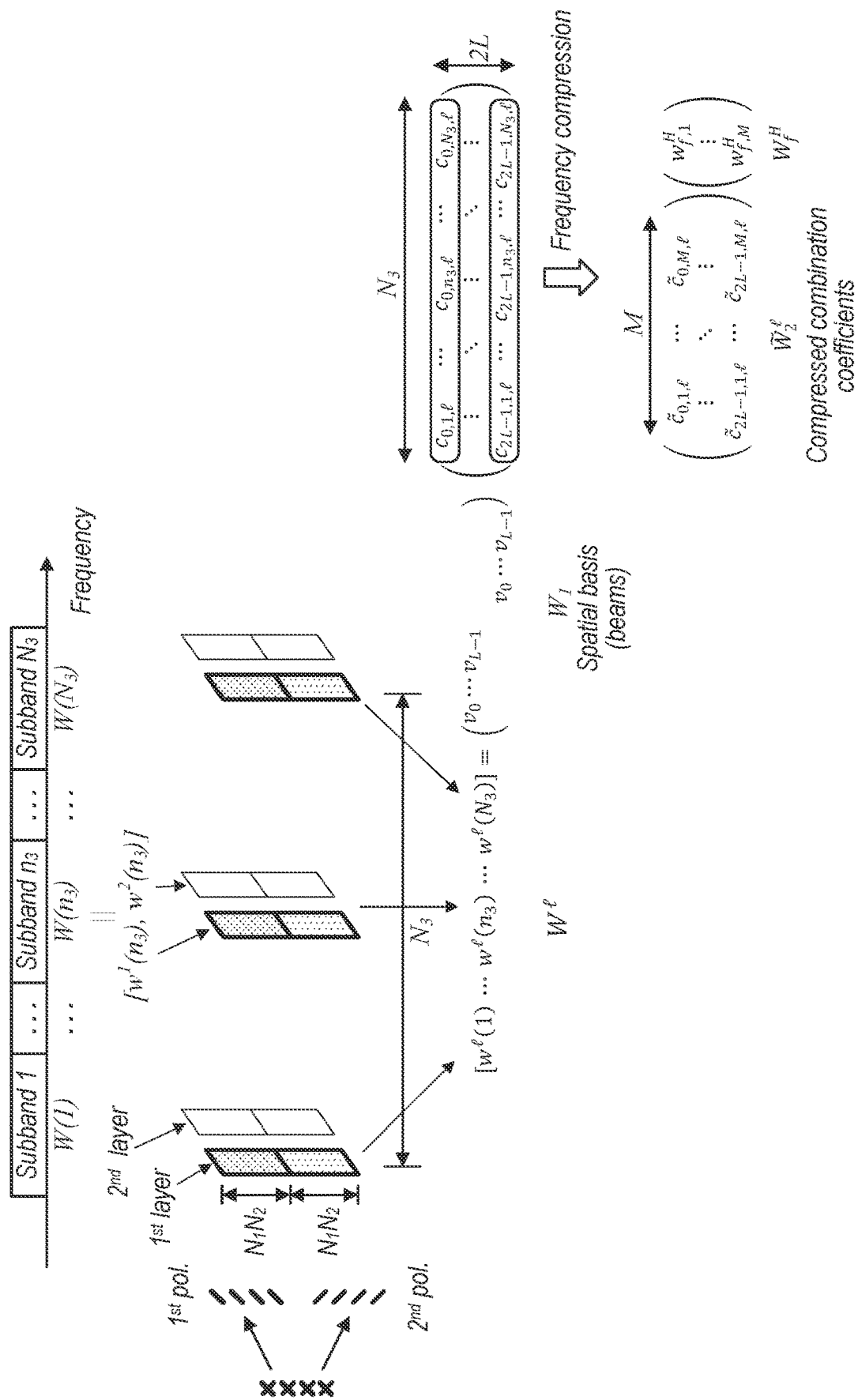
FIG. 9 shows an exemplary diagram illustrating improved CBSR associated with Type II CSI reporting, according to some embodiments.

FIG. 9 shows an exemplary diagram illustrating improved CBSR associated with Type II CSI reporting, according to some embodiments. As previously mentioned, overhead may consume substantial uplink code bandwidth. In some embodiments, in order to reduce overhead, frequency compression of the combination (or weighting) coefficients may be introduced. Therefore, in addition to spatial basis considerations (previously described), frequency basis may also be considered. If a channel is less frequency-selective, neighboring coefficients may exhibit similarity. For example, $\{c_{i,n_3}\}_{n_3=1}^{N_3}$ are correlated. That is, the combination coefficients across the frequency may have some correlation (they may be correlated across the frequency). If this correlation is extracted to enable decorrelation, then the coefficients may be presented by a small set of frequency bases, $W_f$. Therefore, the overhead may be reduced by compressing the combination coefficient ($\{c_{i,n_3}\}_{n_3=1}^{N_3}$) across the frequency dimension. Each coefficient may then be based on M bases, where M represents the corresponding number of bases and is less than $N_3$, that is, $M<N_3$. This allows the UE to report a small number of combination coefficients while also reporting the frequency basis (or bases) to have the gNB reconstruct the first subband combination coefficients. Coding vectors may therefore be presented not only in the spatial dimension but also in frequency dimension. As noted in FIG. 9, $w_l$ represents the spatial basis column, and $w_f$ represents the frequency basis column. Accordingly, a new CBSR may be devised in which the codebook may be restricted on a frequency basis in addition to being restricted on spatial basis. Following decorrelation, wideband amplitude may no longer be applicable.

Pursuant to the above, separate spatial and frequency restrictions may be implemented for CBSR. Accordingly, the UE may now receive an indication of codebook subset restriction on a spatial basis and also on a frequency basis. In other words, the CBSR may be performed on both a spatial and frequency basis. Thus, the UE may be restricted from reporting CSI based on a subset of frequency bases per gNB configuration, in addition to a spatial basis restriction per the gNB configuration. In some embodiments, the maximum allowed amplitude may be separately configured for a spatial basis and for a frequency basis, yielding a separate maximum allowed amplitude based on spatial consideration and a separate maximum allowed amplitude based on frequency consideration. The maximum allowed amplitude may be layer specific, i.e., each layer may be configured with a different maximum allowed amplitude for different ranks. At least three different combinations of spatial/frequency basis consideration may be implemented. In a first implementation, a UE may be configured with restricted spatial basis dependent amplitude and unrestricted frequency basis dependent amplitude. In a second implementation, the UE may be configured with restricted frequency basis dependent amplitude and unrestricted spatial basis dependent amplitude. Finally, in a third implementation, the UE may be configured with both restricted spatial basis dependent amplitude and restricted frequency basis dependent amplitude.

Separate Spatial and Frequency Restrictions

As mentioned above, in some embodiments, both the maximum allowed amplitude for spatial basis and the maximum allowed amplitude for frequency basis may be configured. This may be implemented in a variety of different embodiments which may be grouped into three different alternatives. In a first alternative, the amplitude of each coefficient may be represented by at most three components, as expressed by the equation $c_{i,m,l} = P_{i,l}^{(1)} P_{i,m,l}^{(2)} P_{m,l}^{(3)} \cdot \emptyset_{i,m,l}$, where the three components are:

a spatial basis dependent amplitude ($P_{i,l}^{(1)}$);
a frequency basis dependent amplitude ($P_{m,l}^{(3)}$); and
an amplitude dependent on both spatial basis and frequency basis ($P_{i,m,l}^{(2)}$);
where ($P_{i,l}^{(1)}$) and ($P_{i,l}^{(1)}$) shall not exceed the configured maximum allowed value(s), respectively.

In a second alternative, the amplitude of each coefficient may be represented by a single component $P_{i,m,l}$, where $P_{i,m,l}$ shall not exceed the maximum allowed value configured for the corresponding spatial basis (or bases), and shall also not exceed the maximum allowed value configured for the corresponding frequency basis (or bases). In a third alternative, the amplitude of each coefficient may be represented by a single component $P_{i,m,l}$, where $P_{i,m,l}$ shall not exceed the product of the maximum allowed values configured for the corresponding spatial basis (or bases) and frequency basis (or bases).

Figure 10:
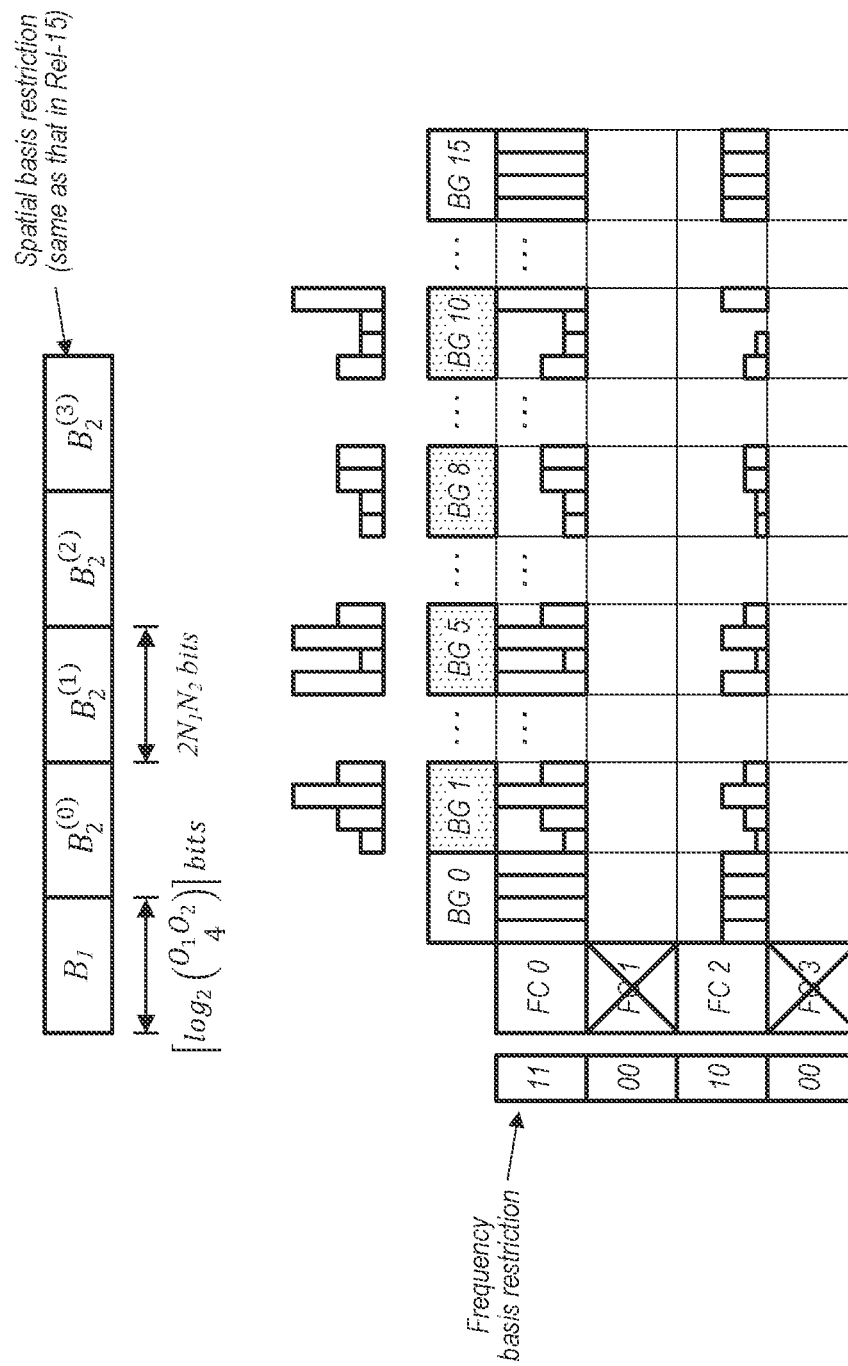
FIG. 10 shows a diagram illustrating one example of separate spatial basis and frequency basis restrictions for improved CBSR, according to some embodiments.

FIG. 10 shows a diagram illustrating one example of separate spatial basis and frequency basis restrictions, according to some embodiments. In embodiments exemplified in FIG. 10, a 2-bit indication may be provided to the UE by the gNB for each frequency component. That is, for each frequency basis (FC), a 2-bit amplitude restriction may be configured. When the amplitude is set to zero for a given frequency component, the given frequency component is restricted entirely. In other words, the given frequency component may not be considered for CSI (or PMI) reporting by the UE. As shown in FIG. 10, for FC 0, the amplitude restriction is 1, for FC 2, the amplitude restriction is ½, and FCs 1 and 3 are entirely restricted from CSI reporting. In the bottom diagram of FIG. 10, the frequency basis restriction is indicated on the vertical axis while the spatial basis restriction is indicated on the horizontal axis. Consistent with FIGS. 6 through 9, beam groups 1, 5, 8, and 10 are restricted on a spatial basis.

Joint Spatial-Frequency Restriction

Figure 11:
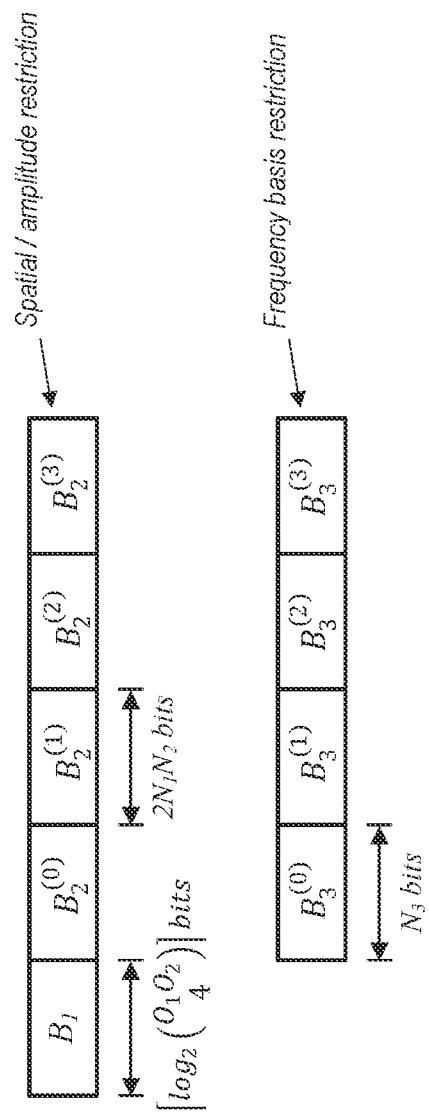
FIG. 11 shows a diagram illustrating one example of joint spatial-frequency restriction for improved CBSR, according to some embodiments.
Figure 11:
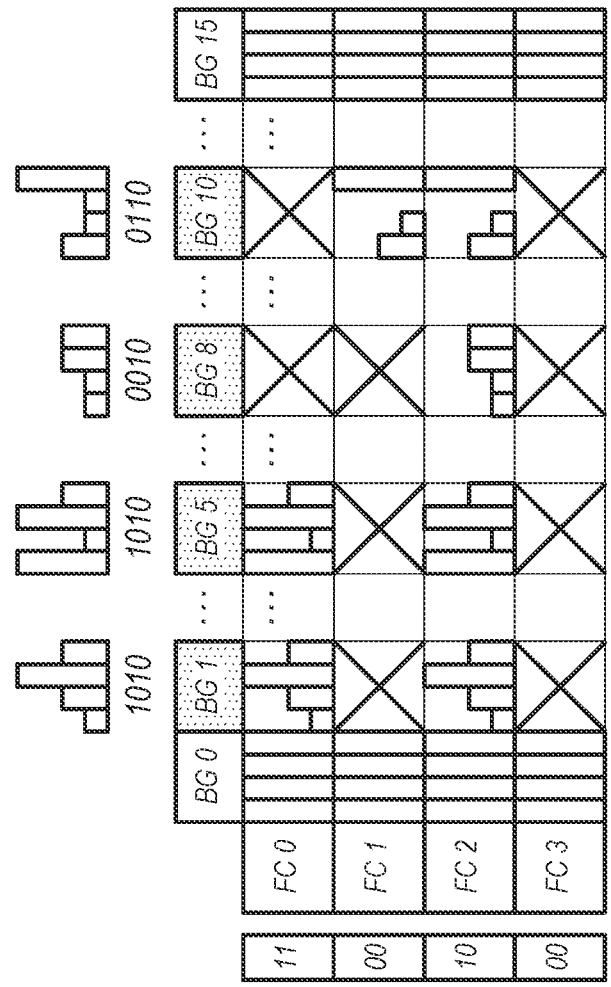

FIG. 11 shows a diagram illustrating one example of joint spatial-frequency restriction, according to some embodiments. As illustrated in FIG. 11, a UE may be restricted from reporting a subset of combinations of spatial and frequency bases per gNB configuration. In such a case the UE may be configured with a subset of spatial basis groups, with a set of frequency basis restriction configured for each spatial basis group. When a frequency basis is restricted, it may not be considered (by the UE) for CSI reporting with the associated spatial basis. For each spatial basis group, a maximum allowed amplitude may be configured for each basis in the group. That is, a maximum allowed amplitude may be indicated for each combination. For each beam group, the frequency component to be used may also be indicated. For maximum amplitude, the configuration for the beam groups may still be followed.

In the example shown in FIG. 11, for each restricted spatial beam group, a specific frequency basis restriction is configured. On the other hand, for spatial basis groups without restriction, the frequency basis is not restricted. In contrast to the example shown in FIG. 10, where frequency bases 1 and 3 were restricted completely (regardless of spatial basis), in the example of FIG. 11, spatially unrestricted beam groups 0 and 15 are not frequency restricted. However, as indicated by the respective frequency basis restriction for each spatially restricted beam group (1, 5, 8, and 10), each spatially restricted beam group may also have a frequency basis restriction applied as shown.

In some embodiments, frequency basis restriction and spatial basis restriction may not be applied simultaneously. That is, restriction may be either on a spatial basis or a frequency basis, depending on certain parameters. For example, the applicability of spatial/frequency restriction may be dependent on the spatial/frequency granularity. Considering the number ($N_1$, $N_2$) of transmit ports or antennas, a smaller number of antennas (e.g. $N_1$ and $N_2$ are both either equal to or lower than 4) may suggest wider spatial beams and less PMI hypotheses, for which a spatial basis restriction may be less efficient, and therefore a frequency basis restriction may be preferred. Thus, in some embodiments, for CBSR, a frequency basis restriction may be provided by gNB to the UE but not a spatial basis restriction. On the other hand, a larger number of antennas (e.g. $N_1$ and $N_2$ are both either equal to or larger than 8) may suggest narrow spatial beams and more PMI hypotheses, for which each spatial beam may correspond to a single frequency basis, therefore a spatial basis restriction may be sufficient. Thus, in some embodiments, for CBSR, a spatial basis restriction may be provided by gNB to the UE but not a frequency basis restriction. Thus, frequency basis restriction may be supported for some combination of (N1, N2), and the configuration of frequency basis restriction may be at least partially based on the value of (N1, N2).

Configuring the Number of Frequency Bases for Enhanced Type II CSI Reporting

Figure 12:
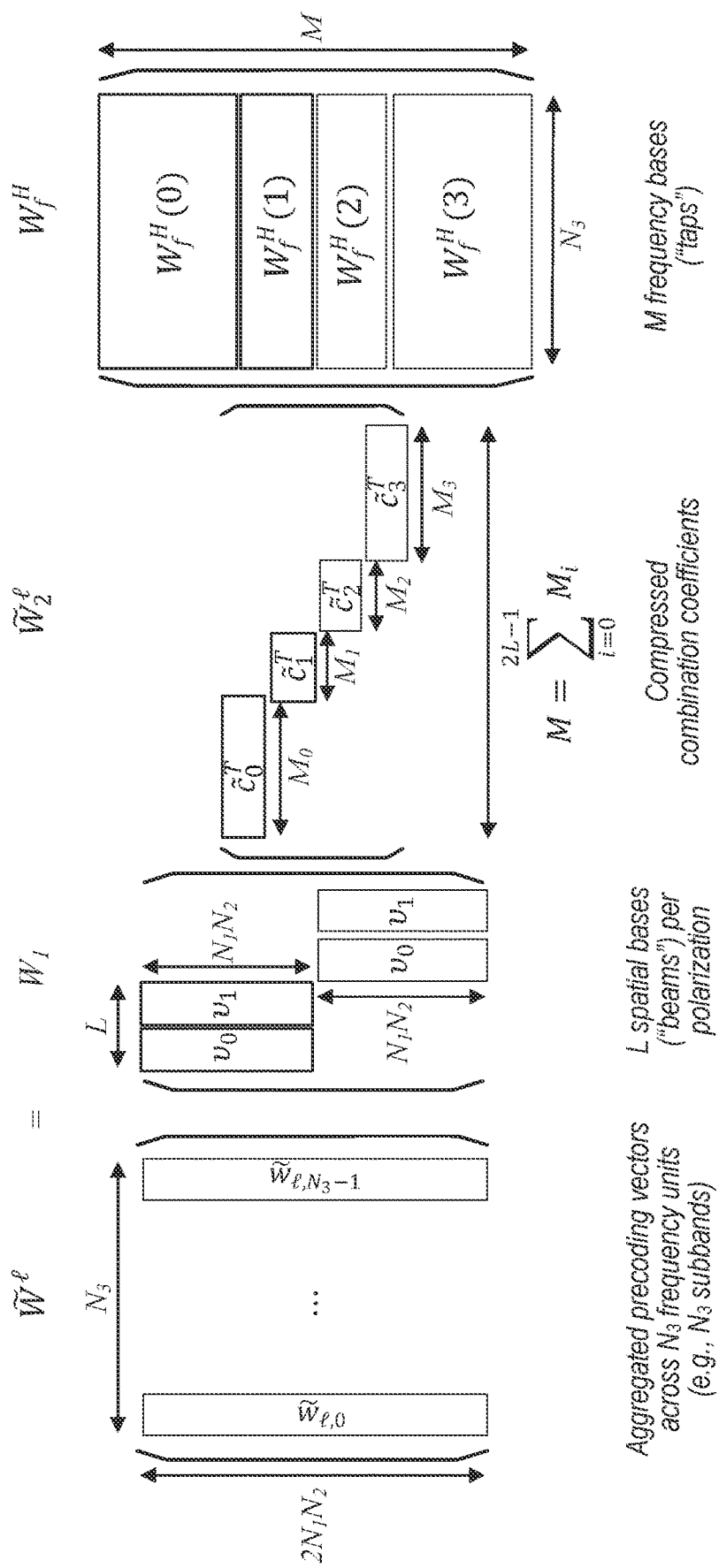
FIG. 12 shows a diagram of an exemplary precoder structure with frequency compression for improved CBSR, according to some embodiments.

Referring again to FIGS. 6 through 9, as previously mentioned, in some embodiments, the frequency basis may be beam specific. For example, frequency basis may be considered for different polarizations and for different spatial beams. FIG. 12 shows a diagram of an exemplary precoder structure with frequency compression, according to some embodiments. The equation in FIG. 12 represents the aggregated precoding vector for the lth layer. In the exemplary configuration shown in FIG. 12, there are L spatial bases (or beams) per polarization, with L=2 and the spatial bases (per polarization) denoted by $v_0$ and $v_1$, respectively. As shown in FIG. 12, $v_0$ represents the first spatial beam (or spatial basis) of the first polarization with corresponding number $M_0$ frequency bases. The second spatial beam (or spatial basis) $v_1$ in the first polarization may have a smaller corresponding number $M_1$ of frequency bases. Similarly, $v_0$ for the second polarization has a corresponding number $M_2$ of frequency bases, and $v_1$ for the second polarization has a corresponding number $M_3$ of frequency bases. That is, $M_0$ represents the number of frequency bases corresponding to $v_0$ in the first polarization, $M_i$ represents the number of frequency bases corresponding to $v_1$ in the first polarization, $M_2$ represents the number of frequency bases corresponding to $v_0$ in the second polarization, and $M_3$ represents the number of frequency bases corresponding to $v_1$ in the second polarization. Upon determining the respective values (of)

$M_0$, $M_1$, $M_2$ and $M_3$, the value (of) M may obtained, which represents (corresponds to) the (horizontal) dimension of the $W_2$ matrix. Accordingly, M (or the value of M) also represents the number of overall frequency bases (or vertical dimension) of the $W_f$ matrix. $N_3$ (or the value of $N_3$) represents the number of frequency units (e.g. the number of subbands).

For each ith spatial basis, the corresponding combination coefficient is a linear combination of the corresponding number $M_i$ of frequency bases. The value (of) $M_i$ maybe selected by the UE and reported in CSI, or it may be configured in the UE by the gNB via higher-layer (e.g. RRC) signaling. In some embodiments, referred to as explicit configuration, the gNB may configure the value in the UE via dedicated radio resource control (RRC) signaling. For example, the UE may obtain the value of $M_i$ explicitly from the base station via dedicated higher-layer (e.g. RRC) signaling. In some embodiments, referred to as implicit configuration, the value may be derived by the UE from some other RRC parameters based on specified, predefined rules.

In a first implementation, the value (of) $M_i$ may be a function of the number of ports in both dimensions (vertical and horizontal). That is, the value (of) $M_i$ may be a function of ($N_1$, $N_2$). A large number of $N_1$ and $N_2$ (again, equal to or greater than 8, for example) may result in a narrower spatial beam, and a small $M_i$ value may therefore be sufficient.

In a second implementation, the frequency dimension may be considered. Here the UE may be required to report a large number of subbands. The value (of) $M_i$ may be a function of $N_3$. A large $N_3$ value may result in more resolvable paths, therefore a large $M_i$ value may be preferable. E.g., $M_i = f_2(N_3)$.

In a third implementation, both spatial and frequency considerations may be taken into account. In this case the value (of) $M_i$ may be a function of ($N_1$, $N_2$, $N_3$), and the spatial-temporal granularity may be jointly considered. E.g., $M_i = f_3(\max(N_1, N_2), N_3)$.

Configuring PMI Frequency Compression Units for Enhanced NR Type II CSI

Referring again to FIG. 9, consideration may be given to determining the length of the frequency basis. In practical terms this leads to determining how to choose the dimension of the $W_f$ matrix. It should be noted that there is a clear relationship between the frequency and the time domain (Fourier Transform), which makes it possible to use a Fast Fourier Transform (FFT). For example if the UE is required to report CSI for a specified number (e.g. 5) of subbands, then the column of $W_f$ may have a corresponding same number (in this case 5) entries. The value for each subband may be obtained. In proposed systems, the no. of resource blocks (RBs) may range from 1 to 275 (as an example of the wider range). Thus, FFT may be supported for this range. A relationship/link may be established between the number of CSI frequency units and the FFT size for the dimension of $W_f$.

The frequency basis in $W_f$ may be a subset of DFT vectors. The dimension of the frequency basis may thus equal to the number of CSI frequency units (e.g., the number of subbands as indicated in the CSI reporting band). The number of subbands may be any integer in a specified range, for example in the range of 1 to 19, according to current 3GPP specifications. For finer PMI frequency units, the dimension of the frequency basis may vary in a much wider range, e.g. from 1 to hundreds. As mentioned above, the frequency compression may be implemented through FFT.

In order to facilitate the implementation, the dimension of the frequency basis (e.g., FFT size) may be carefully selected.

Pursuant to the above, a new dimension labeled $N''_3$ may be introduced. $N'_3$ may be specified to be less than the FFT size, which is the dimension of each column of the $W_f$ matrix as denoted by $N''_3$. The dimension of frequency basis may thus be defined by $N''_3 = 2^i 3^j 5^k$, for FFT implementation. The values of i, j, k may selected such that $N''_3$ is the smallest integer larger than $N'_3$, where $N'_3$ is the maximum number of the PMI FD compression units in the given bandwidth part (BWP) or in the given component carrier (CC). $N_3$, then, is the number of the PMI FD compression units to be reported, and may be less than $N'_3$. E.g., the gNB may disable some subbands by setting the corresponding bits to '0's in the CSI reporting band. Therefore, the following inequality may be observed: $N''_3 \geq N'_3 \geq N_3$.

Figure 13:
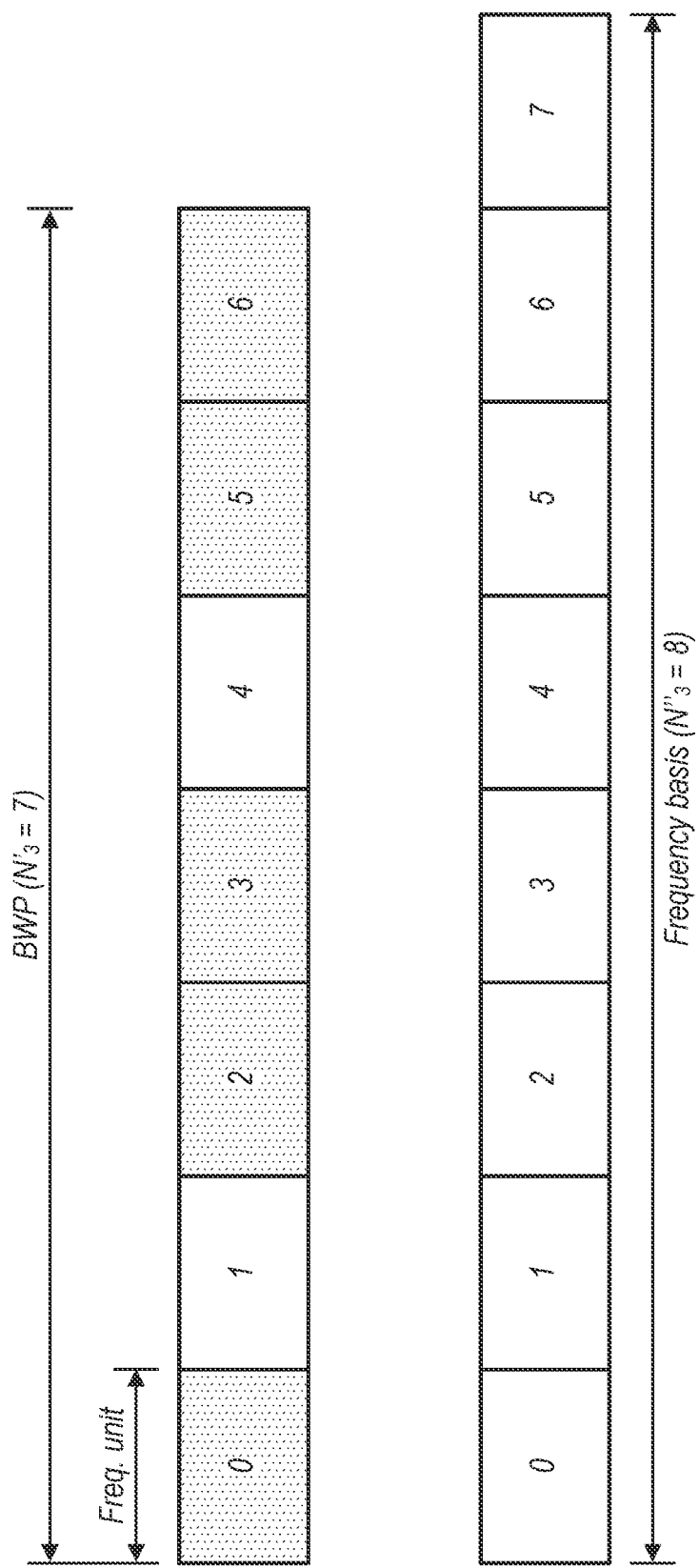
FIG. 13 shows a diagram illustrating an example of PMI frequency compression unit configuration for improved CBSR, according to some embodiments.

FIG. 13 shows a diagram illustrating an example of PMI frequency compression unit configuration, according to some embodiments. As shown in FIG. 12, the BWP contains $N'_3 = 7$ (seven) subbands. The value in the CSI reporting band=1011011, that is, the UE is requested to report CSI on subbands 0, 2, 3, 5, and 6, which means that $N_3 = 5$. The frequency basis dimension is then $N''_3 = 8$. FIG. 14 shows a table of exemplary corresponding values of i, j, k, and $N''_3$ for all the $N_3$ values from 1 to 19.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A processor comprising:
an interface configured to receive and provide signals; and
a processing circuit coupled with the interface and configured to:
cause transmission, from a base station to a device, of an indication of codebook subset restriction (CBSR), wherein the indication includes at least a restriction on a frequency basis and a spatial basis, wherein the restriction is an amplitude restriction based on a product of corresponding spatial basis and frequency basis values for a beam group; and
cause reception, from the device by the base station, of a channel state information (CSI) according to the transmitted indication of CBSR.

2. The processor of claim 1, wherein the frequency basis is a compressed frequency basis.

3. The processor of claim 1, wherein a maximum allowed amplitude of a weighting coefficient included in the indication of CBSR is layer specific, wherein the weighting coefficient is used in determining a column vector of a precoding matrix used by the base station and the device.

4. The processor of claim 1, wherein the indication of CBSR includes a restricted spatial basis dependent amplitude of a weighting coefficient and an unrestricted frequency basis dependent amplitude of the weighting coefficient, wherein the weighting coefficient is associated with a column vector of a precoding matrix used by the base station and the device.

5. The processor of claim 1, wherein the indication of CBSR includes a restricted frequency basis dependent amplitude of a weighting coefficient and an unrestricted spatial basis dependent amplitude of the weighting coefficient, wherein the weighting coefficient is associated with a column vector of a precoding matrix used by the base station and the device.

6. The processor of claim 1, wherein the indication of CBSR includes a restricted frequency basis dependent amplitude of a weighting coefficient and a restricted spatial basis dependent amplitude of the weighting coefficient, wherein the weighting coefficient is associated with a column vector of a precoding matrix used by the base station and the device.

7. The processor of claim 1, wherein the indication of CBSR includes a maximum allowed amplitude of a weighting coefficient defined by:
a spatial basis dependent amplitude;
a frequency basis dependent amplitude; and
a spatial basis and frequency basis dependent amplitude;
wherein the weighting coefficient is associated with a column vector of a precoding matrix used by the base station and the device.

8. The processor of claim 1, wherein the indication of CBSR includes a respective amplitude restriction corresponding to each frequency component, wherein the respective amplitude restriction is for a weighting coefficient associated with a column vector of a precoding matrix used by the base station and the device.

9. The processor of claim 1, wherein the indication of CBSR configures a subset of spatial basis groups and a respective set of frequency basis restriction for each of the spatial basis groups in the device.

10. The processor of claim 1, wherein the indication of CBSR includes a respective maximum allowed amplitude of a weighting coefficient for each combination of spatial and frequency basis, wherein the weighting coefficient is associated with a column vector of a precoding matrix used by the base station and the device.

11. A base station comprising:
radio circuitry configured to transmit and receive wireless signals for wireless communications of the base station; and
a processor communicatively coupled to the radio circuitry and configured to interoperate with the radio circuitry to:
transmit, to a device, an indication of codebook subset restriction (CBSR), wherein the indication includes at least a restriction on a frequency basis and a spatial basis, wherein the restriction is an amplitude restriction based on a product of corresponding spatial basis and frequency basis values for a beam group; and
receive, from the device, a channel state information (CSI) according to the transmitted indication of CBSR.

12. The base station of claim 11, wherein the indication of CBSR includes one of:
a restricted spatial basis dependent amplitude of a weighting coefficient and an unrestricted frequency basis dependent amplitude of the weighting coefficient, wherein the weighting coefficient is associated with a column vector of a precoding matrix used by the base station and the device;
a restricted frequency basis dependent amplitude of the weighting coefficient and an unrestricted spatial basis dependent amplitude of the weighting coefficient;
a restricted frequency basis dependent amplitude of the weighting coefficient and a restricted spatial basis dependent amplitude of the weighting coefficient;
a respective amplitude restriction corresponding to each frequency component, wherein the respective amplitude restriction is for the weighting coefficient;
a respective maximum allowed amplitude of the weighting coefficient for each combination of spatial and frequency basis; or
a maximum allowed amplitude of the weighting coefficient defined by:
a spatial basis dependent amplitude;
a frequency basis dependent amplitude; and
a spatial basis and frequency basis dependent amplitude.

13. The base station of claim 11, wherein the frequency basis is a compressed frequency basis.

14. The base station of claim 11, wherein a maximum allowed amplitude of a weighting coefficient included in the indication of CBSR is layer specific, wherein the weighting coefficient is used in determining a column vector of a precoding matrix used by the base station and the device.

15. The base station of claim 11, wherein the indication of CBSR configures a subset of spatial basis groups and a respective set of frequency basis restriction for each of the spatial basis groups in the device.

16. A non-transitory memory element storing instructions executable by a processor to cause a base station to:
transmit, to a device, an indication of codebook subset restriction (CBSR), wherein the indication includes at least a restriction on a frequency basis and a spatial basis, wherein the restriction is an amplitude restriction based on a product of corresponding spatial basis and frequency basis values for a beam group; and receive, from the device, a channel state information (CSI) according to the transmitted indication of CBSR.

17. The non-transitory memory element of claim 16, wherein the indication of CBSR includes one of:

a restricted spatial basis dependent amplitude of a weighting coefficient and an unrestricted frequency basis dependent amplitude of the weighting coefficient, wherein the weighting coefficient is associated with a column vector of a precoding matrix used by the base station and the device;

a restricted frequency basis dependent amplitude of the weighting coefficient and an unrestricted spatial basis dependent amplitude of the weighting coefficient;

a restricted frequency basis dependent amplitude of the weighting coefficient and a restricted spatial basis dependent amplitude of the weighting coefficient;

a respective amplitude restriction corresponding to each frequency component, wherein the respective amplitude restriction is for the weighting coefficient;

a respective maximum allowed amplitude of the weighting coefficient for each combination of spatial and frequency basis; or a maximum allowed amplitude of the weighting coefficient defined by:
 a spatial basis dependent amplitude;
 a frequency basis dependent amplitude; and
 a spatial basis and frequency basis dependent amplitude.

18. The non-transitory memory element of claim 16, wherein the frequency basis is a compressed frequency basis.

19. The non-transitory memory element of claim 16, wherein a maximum allowed amplitude of a weighting coefficient included in the indication of CBSR is layer specific, wherein the weighting coefficient is used in determining a column vector of a precoding matrix used by the base station and the device.

20. The non-transitory memory element of claim 16, wherein the indication of CBSR configures a subset of spatial basis groups and a respective set of frequency basis restriction for each of the spatial basis groups in the device.

* * * * *